United States Patent
Rabenecker et al.

[11] 3,861,217
[45] Jan. 21, 1975

[54] GAS DETECTION DEVICE

[75] Inventors: Horst Rabenecker, Bad Schwartau; Harald Kredel, Niedereschbach, both of Germany

[73] Assignee: Dragerwerk Aktiengesellschaft, Lubeck, Germany

[22] Filed: Mar. 8, 1973

[21] Appl. No.: 339,077

[30] Foreign Application Priority Data
Mar. 15, 1972 Germany............................ 2212363

[52] U.S. Cl............................................. 73/421.5 R
[51] Int. Cl.............................................. G01n 1/24
[58] Field of Search....... 73/23, 262, 269, 270, 271, 73/421.5 R; 417/394, 472; 92/129

[56] References Cited
UNITED STATES PATENTS

| | | | |
|---|---|---|---|
| 1,696,600 | 12/1928 | Hall..................... | 73/194 R |
| 2,368,101 | 1/1945 | Bottcher............... | 417/394 X |
| 3,376,694 | 4/1968 | Owens et al........... | 73/23.1 X |
| 3,422,681 | 1/1969 | Sanders................ | 73/421.5 R |
| 3,597,120 | 8/1971 | Reed.................... | 417/394 |

Primary Examiner—Jerry W. Myracle
Assistant Examiner—Stephen A. Kreitman
Attorney, Agent, or Firm—McGlew and Tuttle

[57] ABSTRACT

A gas detection device includes a vessel having a sampling chamber with a collapsible bellows-like well and including an attachment connected to the sampling chamber for a sampling tube into which a gas or similar fluid is directed for testing purposes. The bellows is held in an expanded position by an expanding spring in the chamber and it is driven to a close position to collapse the sampling chamber by a drive piston which is operated from a compressed air tank. The compressed air tank feeds the compressed air through a reversing valve mechanism which is controlled by a lever to alternately pressurize and exhaust the drive piston cylinder. A counter is associated with the reversing valve mechanism for indcating the strokes of operation of the device.

8 Claims, 1 Drawing Figure

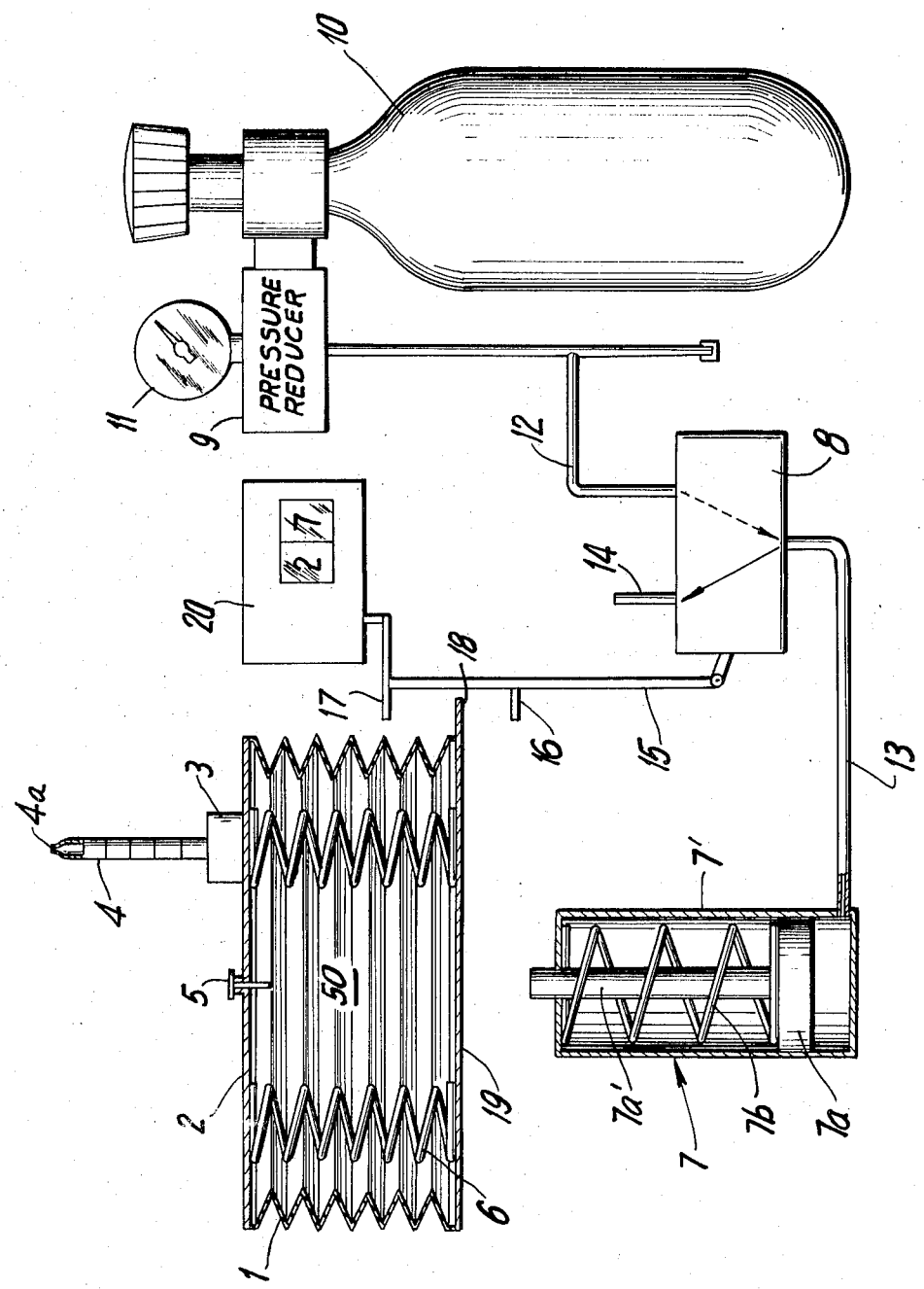

GAS DETECTION DEVICE

BACKGROUND OF THE INVENTION

1. Field of the Invention

This invention relates in general to gas-detection devices and, in particular, to a new and useful gas detection device which includes an expandable and contractable air pumping member which is operated by a drive member using a compressed air supply.

2. Description of the Prior Art

Gas or dust detectors and measuring instruments are known for detecting and measuring foreign constituents in gases or air. A group of these devices is equipped with a bellows pump which has a working stroke which is produced by a spring force and has a return stroke which is produced by another force. With such a bellows-type pump the gas or the air is conducted, for example, over or through a reagent layer which contains a reagent for the respective constituents to be determined. Other forms of the parts are also known which serve to detect and measure the substances to be detected. In the known bellows pump, the movable bellows part is arranged in a pressure plate and moves back and forth in the range of motion of a driving unit which may be, for example, a clockwork mechanism, such as an electric motor, etc. The speed of the driving member is greater than the speed of the movable bellows part during the working stroke of the bellows pump. The driving unit is so controlled that the pressure element of the driving unit stands still at the end of its return movement during the continuation of the working stroke in one end position. An air conveyor device of a known spring loaded gas detecting hand pump can serve as an air conveyor device. For the control of the gas detecting pump, a pressure measuring element such as a pressure cell, can be arranged on the intake side of the bellows pump. This shuts off the driving unit at an underpressure on the suction side of the pump while it starts the driving unit at normal pressure on the suction side of the pump. Another control device of the known gas detecting pump includes a pressure measuring element such as a pressure cell which is connected to the pressure side of the bellows pump and which shuts off the driving unit at an overpressure on the delivery side of the pump and it starts the driving unit at a normal pressure on the delivery side of the pump.

The use of electric drives is not feasible, particularly if the gas detector is to be explosion-proof. The use of a clockwork mechanism as a drive is not feasible because it is not possible to produce the necessary driving forces in a technically simple construction for a very long period of time.

SUMMARY OF THE INVENTION

The present invention provides a gas detector of the known type having a simple driving unit which is explosive-proof and which contains sufficient driving energy in a small space and which is handy and requires no special attendance. The invention concerns a gas or dust detector and measuring instrument which is equipped with a bellows pump whose movable bellows part is driven by a driving unit and in which the driving force is transmitted by a pressure element whose speed is greater than the speed of the movable bellows part during the working stroke. The driving force is so controlled that the pressure element is moved backwardly and forwardly over a full stroke and the pressure element is in the end position at the end of its return stroke during the continuation of the working stroke with the bellows pump. With the inventive arrangement, the driving unit of the bellows pump is operated by compressed air. This has the advantage that the device will be very simple in construction and also have enough working energy.

In accordance with another feature of the invention, the driving unit comprises a piston drive connected to the compressed air bottle through a pressure reducer and a control device. In order to further simplify the invention, the control device comprises a reversing valve which keeps the connection between the pressure reducer and the piston drive open in one end position of the bellows pump. The reversing valve can be provided with a shifting linkage which is provided with two stops which are arranged in the range of a control member provided on the movable bellows part. The reversing valve mechanism which is connected between the container of the compressed air and the working piston operates in accordance with the movement of the bellows to intermittently pressurize and vent the space behind the driving piston.

According to another feature of the invention, the driving unit is connected to a counter which counts the number of forward and return movements of the bellows pump and which is advantageously associated with the reversing mechanism for regulating the compressed air supply to the driving piston. The driving unit may be connected directly to a compressed air main and instead of to a compressed air supply of a compressed air bottle.

Accordingly, it is an object of the invention to provide a gas detection device which includes a vessel defining an air sampling chamber having a collapsible bellows-like wall and having an attachment for a sampling tube to be connected to the sampling chamber, and which includes a drive piston adjacent the bellows which is movable in a driving direction to contact and collapse the bellows to evacuate the gas in the sampling chamber and which includes a source of compressed air which is connected to the drive piston for operating it.

A further object of the invention is to provide a gas detection device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The only FIGURE of the drawings is a schematic sectional view of a gas detection device constructed in accordance with the invention.

GENERAL DESCRIPTION OF THE PREFERRED EMBODIMENT

Referring to the drawings in particular, the invention embodied therein comprises a gas detection device which includes wall means defining an expandable and contractable chamber 50 which includes an expandable and collapsible bellows-like wall 1 which is secured to an end wall or base 2 and which has an opposite movable wall 19 secured to the outer end of the bellows-like wall 1. Air to be sampled is drawn in through an open end 4a of a test tube or sampling tube 4 which is connected through a connecting socket 3 to the chamber 50. An outlet valve or non-return valve 5 is provided on the end wall 2. Compression spring 6 located within the chamber 50 bears against the end wall 2 and the outer movable wall 19 and urges the movable wall 19 into a position in which it is ready for actuation, and in which it is extended away from the base wall 2. Movement of the wall 19 to cause the collapsing movement of the bellows-like wall 1 causes a pumping action which, in the collapsing direction directs air or gas through the non-return valve, and, in the opposite expanding direction, causes the inflow of sampling air through the opening 4a of the test tube 4.

In accordance with the invention, the driving unit for the bellows pump system described above is operated from compressed air which is contained in a compressed air bottle 10. The compressed air bottle 10 is connected through a pressure reducer 9 to a conduit 12 which connects through a reversing valve 8 to a conduit 13 of a fluid pressure operated driving cylinder and piston combination generally designated 7. A manometer 11 provides means for checking the pressure of the compressed air bottle.

The reversing valve 8 includes a shifting linkage 15 which has two stop elements or projections 16 and 17 which are arranged on respective sides of an extension 18 of the movable wall 19. The shifting linkage 15 is also connected to a counter 20 which is constructed to register an increased number every time the shifting linkage is moved through a complete cycle. The counter 20 may also comprise a program switch by which the reversing valve is turned on at certain time intervals and which can be varied in its operation.

The operation of the device is as follows:

In the ready position, the bellows-like wall 1 is fully extended by the spring 6 and this causes the stop face 18 to engage the stop 16 and move the shifting linkage 15 into the bottom position which is not shown in the drawings. In the bottom position, the line 12 is connected to the line 13 through the reversing valve 8. Compressed air will then flow from the compressed air tank 10 to the fluid piston and cylinder drive 7 to move a piston 7a within a fluid pressure cylinder 7' to cause a piston rod portion 7a' to engage the movable wall 19 to urge it in the direction of the base wall 2 to cause the air which is contained in the chamber 50 to be ejected through the non-return valve 5. When the stop face 18 has reached the stop 17 and moves the linkage 15 along therewith, the reversing valve 8 is switched so that the connection between the lines 12 and 13 is closed and the compressed air contained in the fluid cylinder 7 is vented through a relief vent connection 14 at the reversing valve 8. The piston 7a is returned by a return spring 7b.

The counter 20 counts the working strokes. Instead of the counter, it is also possible to have a program switch by which the reversing valve is turned on for a certain number of working strokes and also for certain time intervals.

While a specific embodiment of the invention has been shown and described in detail to illustrate the application of the inventive principles, it will be understood that the invention may be embodied otherwise without departing from such principles.

What is claimed is:

1. A device for aspirating air through a sample measuring tube, comprising a vessel defining an air chamber having a collapsible bellows-like wall and having a sampling tube attachment with a connection to said air chamber, spring means biasing said bellows-like wall to an opened expanded position, a drive piston adjacent said bellows-like wall being movable in a driving direction to contact said bellows-like wall and to collapse it to exhaust the gas in said chamber, said spring means moving said bellows-like wall to an expanded position after it is collapsed to bring sampling air through said sampling tube, a source of compressed air, and valve means connected between said source of compressed air and said drive piston to supply compressed air to said drive piston to drive it to move said bellows to a collapsed position, said valve means including a member operated by collapsing and expanding of said bellows to close and open the connection to said compressed air source.

2. A gas detection device, according to claim 1, including a fluid pressure cylinder in which said drive piston is connected to said compressed air source, said compressed air source comprising a compressed air bottle, a pressure reducer in the line between said compressed air bottle and said cylinder and said valve means a reversing valve in said line between said compressed air bottle and said cylinder, said reversing valve having means for alternately connecting said cylinder to the compressed air bottle and to vent said cylinder.

3. A gas detection device according to claim 2, including a shifting linkage for said reversing valve for shifting said valve between a first operative position in which said valve connects said cylinder with said compressed air bottle to a second operative position in which said cylinder is connected to a vent to the atmosphere, said shifting linkage being connected to said bellows-like wall to operate said reversing valve in accordance with the movement of said wall.

4. A device for aspirating air through a sampling tube, comprising a bellows pump including a base wall having a sampling tube connection thereon for connecting the interior of said pump to the sampling tube, said pump including a bellows-like wall with a movable wall opposite to said base wall and spring means to urge said movable wall away from said base wall, check valve means connected to the interior of said pump permitting flow of air out of said pump upon collapsing of said bellows-like wall, the expansion of said bellows-like wall permitting inflow into the sampling tube, said movable wall having an extending portion forming a stop face, a fluid pressure drive for said pump including a fluid pressure cylinder, a piston movable in said cylinder having a rod portion engageable with said movable wall to move said movable wall into a collapsed position against the force of said spring, spring means in said piston to move it to a return position in a direction opposite to said movable wall, a compressed air bottle, a connection between said compressed air bottle and said fluid cylinder having a reversing valve in said connection, said reversing valve having means for connecting said compressed air bottle to said cylinder and for shutting off the connection of said compressed air bottle and for venting said cylinder, and a reversing layer connected to said reversing valve for reversing the connections between said compressed air bottle and the vent to said cylinder, and having a projecting surface engageable by said stop surface for moving said lever to actuate said reversing valve.

5. A gas detection device, according to claim 4, including a counter connected to said reversing valve lever, said reversing valve lever having a second projecting surface which is engageable by said stop face when said stop face is moved in a direction in which said movable wall is moved toward said base wall.

6. A gas detection device, according to claim 4, including a program switch connected to said reversing lever for programming the movement of said reversing lever.

7. A gas detection device, according to claim 6, wherein said program switch is arranged on said reversing valve.

8. A gas detection device, according to claim 6, wherein said program switch is connected to the said reversing lever.

* * * * *